United States Patent
Gilchrist, III et al.

(10) Patent No.: US 10,843,817 B2
(45) Date of Patent: *Nov. 24, 2020

(54) SYSTEMS AND METHODS FOR RECOVERING AND CONTROLLING POST-RECOVERY MOTION OF UNMANNED AIRCRAFT

(71) Applicant: Insitu, Inc., Bingen, WA (US)

(72) Inventors: Robert Gilchrist, III, Cook, WA (US); John Stafford, Lyle, WA (US); Brian D. Dennis, White Salmon, WA (US); Allen Smith, Hood River, OR (US); Jaime Mack, White Salmon, WA (US); Steven M. Sliwa, White Salmon, WA (US); Bradley Louis Schrick, Hood River, OR (US); Robert Hughes, Springfield, VA (US)

(73) Assignee: Insitu, Inc., Bingen, WA (US)

( * ) Notice: Subject to any disclaimer, the term of this patent is extended or adjusted under 35 U.S.C. 154(b) by 309 days.

This patent is subject to a terminal disclaimer.

(21) Appl. No.: 15/918,624

(22) Filed: Mar. 12, 2018

(65) Prior Publication Data

US 2018/0273204 A1 Sep. 27, 2018

Related U.S. Application Data

(63) Continuation of application No. 13/279,148, filed on Oct. 21, 2011, now Pat. No. 9,944,408, which is a
(Continued)

(51) Int. Cl.
*B64F 1/02* (2006.01)
(52) U.S. Cl.
CPC .......... *B64F 1/02* (2013.01); *B64C 2201/182* (2013.01)

(58) Field of Classification Search
CPC .... B64F 1/025; B64F 1/02; B64F 1/00; B64C 2201/185; B64C 2201/182; B64C 20/024;
(Continued)

(56) References Cited

U.S. PATENT DOCUMENTS

| 965,881 A | 8/1910 | Draper |
|---|---|---|
| 968,339 A | 8/1910 | Geraldson |

(Continued)

FOREIGN PATENT DOCUMENTS

| AU | 2015275315 | 1/2016 |
|---|---|---|
| CN | 1032645 A | 5/1989 |

(Continued)

OTHER PUBLICATIONS

U.S. Appl. No. 15/638,137, filed Jun. 29, 2017, Leon.
(Continued)

*Primary Examiner* — Medhat Badawi
*Assistant Examiner* — Vicente Rodriguez
(74) *Attorney, Agent, or Firm* — Hanley, Flight & Zimmerman, LLC

(57) ABSTRACT

Systems and methods for recovering unmanned aircraft and controlling post-recovery motion of the aircraft are disclosed herein. An aircraft recovery system for handling an unmanned aircraft in accordance with one embodiment of the disclosure includes a base portion and an elongated aircraft capture member having a first end movably coupled to the base portion and a second, free end opposite the first end. The aircraft capture member includes a first portion and a second portion at a distal end of the first portion and positioned to intercept an unmanned aircraft in flight. The first and/or second portions are generally flexible. The system further includes an energy capture and dissipation
(Continued)

assembly operably coupled to the aircraft capture member and positioned to receive at least a portion of the landing forces from the aircraft.

23 Claims, 10 Drawing Sheets

Related U.S. Application Data continuation of application No. PCT/US2010/032314, filed on Apr. 23, 2010.

(60) Provisional application No. 61/172,663, filed on Apr. 24, 2009.

(58) Field of Classification Search
CPC ..... B64C 20/066; B64C 20/084; B64C 25/68; B64C 39/024; B64D 45/06; B66C 23/18
See application file for complete search history.

(56) References Cited

U.S. PATENT DOCUMENTS

| | | |
|---|---|---|
| 975,953 A | 11/1910 | Hourwich |
| 1,144,505 A | 6/1915 | Steffan |
| 1,164,967 A | 12/1915 | Thorp |
| 1,317,631 A | 9/1919 | Kinser |
| 1,383,595 A | 7/1921 | Black |
| 1,384,036 A | 7/1921 | Anderson |
| 1,428,163 A | 9/1922 | Harriss |
| 1,499,472 A | 7/1924 | Hazen |
| 1,530,010 A | 3/1925 | Neilson |
| 1,532,736 A | 4/1925 | Dodds |
| 1,556,348 A | 10/1925 | Ray et al. |
| 1,624,188 A | 4/1927 | Simon |
| RE16,613 E | 5/1927 | Moody et al. |
| 1,634,964 A | 7/1927 | Steinmetz |
| 1,680,473 A | 8/1928 | Parker |
| 1,686,298 A | 10/1928 | Uhl |
| 1,712,164 A | 5/1929 | Peppin |
| 1,716,670 A | 6/1929 | Sperry |
| 1,731,091 A | 10/1929 | Belleville |
| 1,737,483 A | 11/1929 | Verret |
| 1,738,261 A | 12/1929 | Perkins |
| 1,748,663 A | 2/1930 | Tucker |
| 1,749,769 A | 3/1930 | Johnson |
| 1,756,747 A | 4/1930 | Holland |
| 1,777,167 A | 9/1930 | Forbes |
| 1,816,976 A | 8/1931 | Kirkham |
| 1,825,578 A | 9/1931 | Cernuda |
| 1,836,010 A | 12/1931 | Audrain |
| 1,842,432 A | 1/1932 | Stanton |
| 1,869,506 A | 8/1932 | Richardson |
| 1,892,357 A | 12/1932 | Moe |
| 1,909,445 A | 5/1933 | Ahola |
| 1,912,723 A | 6/1933 | Perkins |
| 1,925,212 A | 9/1933 | Steiber |
| 1,940,030 A | 12/1933 | Steiber |
| 1,960,264 A | 5/1934 | Heinkel |
| 2,211,089 A | 8/1940 | Berlin |
| 2,286,381 A | 6/1942 | Rubissow |
| 2,296,988 A | 9/1942 | Endter |
| 2,333,559 A | 11/1943 | Grady et al. |
| 2,342,773 A | 2/1944 | Wellman et al. |
| 2,347,561 A | 4/1944 | Howard et al. |
| 2,360,220 A | 10/1944 | Goldman |
| 2,364,527 A | 12/1944 | Haygood |
| 2,365,778 A | 12/1944 | Schwab |
| 2,365,827 A | 12/1944 | Liebert |
| 2,380,702 A | 7/1945 | Persons |
| 2,390,754 A | 12/1945 | Valdene |
| 2,401,853 A | 6/1946 | Bailey |
| 2,435,197 A | 2/1948 | Brodie |
| 2,436,240 A | 2/1948 | Wiertz |
| 2,447,945 A | 8/1948 | Knowler |
| 2,448,209 A | 8/1948 | Boyer et al. |
| 2,465,936 A | 3/1949 | Schultz |
| 2,488,050 A | 11/1949 | Brodie |
| 2,488,051 A | 11/1949 | Brodie |
| 2,515,205 A | 7/1950 | Fieux |
| 2,526,348 A | 10/1950 | Gouge |
| 2,669,403 A | 2/1954 | Milligan |
| 2,671,938 A | 3/1954 | Roberts |
| 2,735,391 A | 2/1956 | Buschers |
| 2,787,185 A | 4/1957 | Rea et al. |
| 2,814,453 A | 11/1957 | Trimble et al. |
| 2,843,342 A | 7/1958 | Ward |
| 2,844,340 A | 7/1958 | Daniels et al. |
| 2,908,240 A | 10/1959 | Hodge |
| 2,919,871 A | 1/1960 | Sorensen |
| 2,933,183 A | 4/1960 | Koelsch |
| 2,937,827 A | 5/1960 | Duce |
| 2,954,946 A | 10/1960 | O'Neil et al. |
| 3,069,118 A | 12/1962 | Bernard |
| RE25,406 E | 6/1963 | Byrne et al. |
| 3,120,831 A | 2/1964 | Fulton |
| 3,163,380 A | 12/1964 | Brodie |
| 3,268,090 A | 8/1966 | Wirkkala |
| 3,411,398 A | 11/1968 | Blakeley et al. |
| 3,454,244 A | 7/1969 | Walander |
| 3,468,500 A | 9/1969 | Carlsson |
| 3,484,061 A | 12/1969 | Niemkiewicz |
| 3,512,447 A | 5/1970 | Vaughn |
| 3,516,626 A | 6/1970 | Strance et al. |
| 3,589,651 A | 6/1971 | Niemkiewicz et al. |
| 3,657,956 A | 4/1972 | Bradley et al. |
| 3,672,214 A | 6/1972 | Yasuda |
| 3,684,219 A | 8/1972 | King |
| 3,708,200 A | 1/1973 | Richards |
| 3,765,625 A | 10/1973 | Myhr et al. |
| 3,771,484 A | 11/1973 | Schott et al. |
| 3,827,660 A | 8/1974 | Doolittle |
| 3,939,988 A | 2/1976 | Wellman et al. |
| 3,943,657 A | 3/1976 | Leckie et al. |
| 3,980,259 A | 9/1976 | Greenhalgh et al. |
| 4,037,807 A | 7/1977 | Johnston |
| 4,067,139 A | 1/1978 | Pinkerton et al. |
| 4,079,901 A | 3/1978 | Mayhew et al. |
| 4,143,840 A | 3/1979 | Bernard et al. |
| 4,149,840 A | 3/1979 | Tippmann |
| 4,147,317 A | 4/1979 | Mayhew et al. |
| D256,816 S | 9/1980 | McMahon et al. |
| 4,236,686 A | 12/1980 | Barthelme et al. |
| 4,238,093 A | 12/1980 | Siegel et al. |
| 4,267,987 A | 5/1981 | McDonnell |
| 4,279,195 A | 7/1981 | Miller |
| 4,296,894 A | 10/1981 | Schnabele et al. |
| 4,296,898 A | 10/1981 | Watson |
| 4,311,290 A | 1/1982 | Koper |
| 4,372,016 A | 2/1983 | LaViolette et al. |
| 4,408,737 A | 10/1983 | Schwaerzler et al. |
| 4,410,151 A | 10/1983 | Hoppner et al. |
| 4,457,479 A | 7/1984 | Daude et al. |
| 4,471,923 A | 9/1984 | Hoppner et al. |
| 4,523,729 A | 6/1985 | Frick et al. |
| 4,566,658 A | 1/1986 | DiGiovanniantonio et al. |
| 4,645,142 A | 2/1987 | Soelter |
| 4,645,241 A | 2/1987 | Soelter |
| 4,653,706 A | 3/1987 | Ragiab |
| 4,678,143 A | 7/1987 | Griffin et al. |
| 4,730,793 A | 3/1988 | Thurber, Jr. et al. |
| 4,753,400 A | 6/1988 | Reuter et al. |
| 4,790,497 A | 12/1988 | Yoffe et al. |
| 4,809,933 A | 3/1989 | Buzby et al. |
| 4,842,222 A | 6/1989 | Baird et al. |
| 4,909,458 A | 3/1990 | Martin |
| 4,979,701 A | 12/1990 | Colarik et al. |
| 4,991,739 A | 2/1991 | Levasseur |
| 5,007,875 A | 4/1991 | Dasa |
| 5,039,034 A | 8/1991 | Burgess et al. |
| 5,042,750 A | 8/1991 | Winter |
| 5,054,717 A | 10/1991 | Taylor |
| 5,060,888 A | 10/1991 | Vezain et al. |
| 5,109,788 A | 5/1992 | Heinzmann |

(56) References Cited

U.S. PATENT DOCUMENTS

| | | |
|---|---|---|
| 5,119,935 A | 6/1992 | Stump et al. |
| 5,145,129 A | 9/1992 | Gebhard |
| 5,176,339 A | 1/1993 | Schmidt |
| 5,222,694 A | 6/1993 | Smoot |
| 5,253,605 A | 10/1993 | Collins |
| 5,253,606 A | 10/1993 | Ortelli |
| 5,259,574 A | 11/1993 | Carrot |
| 5,378,851 A | 1/1995 | Brooke et al. |
| 5,390,550 A | 2/1995 | Miller |
| 5,407,153 A | 4/1995 | Kirk et al. |
| 5,509,624 A | 4/1996 | Takahashi |
| 5,583,311 A | 12/1996 | Rieger |
| 5,603,592 A | 2/1997 | Sadri et al. |
| 5,655,944 A | 8/1997 | Fusselman |
| 5,687,930 A | 11/1997 | Wagner et al. |
| 5,762,456 A | 6/1998 | Aasgaard |
| 5,816,761 A | 10/1998 | Cassatt et al. |
| 5,906,336 A | 5/1999 | Eckstein |
| 5,913,479 A | 6/1999 | Westwood, III |
| 6,161,797 A | 12/2000 | Kirk et al. |
| 6,237,875 B1 | 5/2001 | Menne et al. |
| 6,264,140 B1 | 7/2001 | McGeer et al. |
| 6,343,768 B1 | 2/2002 | Muldoon et al. |
| 6,370,455 B1 | 4/2002 | Larson et al. |
| 6,371,410 B1 | 4/2002 | Cairo-Iocco et al. |
| 6,416,019 B1 | 7/2002 | Hilliard et al. |
| 6,442,460 B1 | 8/2002 | Larson et al. |
| 6,457,673 B1 | 10/2002 | Miller |
| 6,478,650 B1 | 11/2002 | Tsai |
| 6,626,077 B1 | 9/2003 | Gilbert |
| 6,695,255 B1 | 2/2004 | Husain |
| 6,758,440 B1 | 7/2004 | Repp et al. |
| 6,772,488 B1 | 8/2004 | Jensen et al. |
| 6,835,045 B1 | 12/2004 | Barbee et al. |
| 6,874,729 B1 | 4/2005 | McDonnell |
| 6,925,690 B2 | 8/2005 | Sievers |
| 7,114,680 B2 | 2/2006 | Dennis |
| 7,059,564 B2 | 6/2006 | Dennis |
| 7,066,430 B2 | 6/2006 | Dennis et al. |
| 7,090,166 B2 | 8/2006 | Dennis et al. |
| 7,121,507 B2 | 10/2006 | Dennis et al. |
| 7,128,294 B2 | 10/2006 | Roeseler et al. |
| 7,140,575 B2 | 11/2006 | McGeer et al. |
| 7,143,974 B2 | 12/2006 | Roeseler et al. |
| 7,152,827 B2 | 12/2006 | McGeer |
| 7,155,322 B2 | 12/2006 | Nakahara et al. |
| 7,165,745 B2 | 1/2007 | McGeer et al. |
| 7,175,135 B2 | 2/2007 | Dennis et al. |
| 7,219,856 B2 | 5/2007 | Watts et al. |
| 7,259,357 B2 | 8/2007 | Walker |
| 7,264,204 B1 | 9/2007 | Portmann |
| 7,410,125 B2 | 8/2008 | Steele |
| 7,422,178 B2 | 9/2008 | DeLaune |
| 7,472,461 B2 | 1/2009 | Anstee |
| 7,510,145 B2 | 3/2009 | Snediker |
| 7,578,467 B2 | 8/2009 | Goodrich |
| 7,686,247 B1 | 3/2010 | Monson et al. |
| 7,740,210 B2 | 6/2010 | Pilon et al. |
| 7,748,661 B2 | 7/2010 | Harris et al. |
| 7,798,445 B2 | 9/2010 | Heppe et al. |
| 7,806,366 B2 | 10/2010 | Jackson |
| 8,016,073 B2 | 9/2011 | Petzel |
| 8,028,952 B2 | 10/2011 | Urnes, Sr. |
| 8,038,090 B2 | 10/2011 | Wilson |
| 8,136,766 B2 | 3/2012 | Dennis |
| 8,172,177 B2 | 5/2012 | Lovell et al. |
| 8,205,537 B1 | 6/2012 | Dupont |
| 8,313,057 B2 | 11/2012 | Rednikov |
| 8,348,714 B2 | 1/2013 | Newton |
| 8,367,963 B2 | 2/2013 | Zajchowski |
| 8,387,540 B2 | 3/2013 | Merems |
| 8,683,770 B2 | 4/2014 | diGirolamo et al. |
| 8,820,698 B2 | 9/2014 | Balfour et al. |
| 8,944,373 B2 | 2/2015 | Dickson et al. |
| 8,950,124 B2 | 2/2015 | Wellershoff |
| 9,085,362 B1 | 7/2015 | Kilian et al. |
| 9,266,610 B2 | 2/2016 | Knapp |
| 9,340,301 B2 | 5/2016 | Dickson et al. |
| 9,359,075 B1 | 6/2016 | von Flotow et al. |
| 9,932,110 B2 | 4/2018 | McNally |
| 9,944,408 B2 | 4/2018 | Gilchrist, III |
| 2002/0011223 A1 | 1/2002 | Zauner et al. |
| 2002/0049447 A1 | 4/2002 | Li |
| 2002/0100838 A1 | 8/2002 | McGeer et al. |
| 2003/0116107 A1 | 6/2003 | Laimbock |
| 2003/0122384 A1 | 7/2003 | Swanson et al. |
| 2003/0202861 A1 | 10/2003 | Nelson |
| 2003/0222173 A1 | 12/2003 | McGeer et al. |
| 2004/0129833 A1 | 7/2004 | Perlo et al. |
| 2005/0132923 A1 | 6/2005 | Lloyd |
| 2005/0187677 A1 | 8/2005 | Walker |
| 2006/0006281 A1 | 1/2006 | Sirkis |
| 2006/0091258 A1 | 5/2006 | Chiu et al. |
| 2006/0102783 A1 | 5/2006 | Dennis et al. |
| 2006/0249623 A1 | 11/2006 | Steele |
| 2006/0271251 A1 | 11/2006 | Hopkins |
| 2007/0023582 A1 | 2/2007 | Steele et al. |
| 2007/0051849 A1 | 3/2007 | Watts |
| 2007/0158498 A1 | 7/2007 | Snediker |
| 2007/0200027 A1 | 8/2007 | Johnson |
| 2007/0261542 A1 | 11/2007 | Chang et al. |
| 2008/0156932 A1 | 7/2008 | McGeer et al. |
| 2008/0191091 A1 | 8/2008 | Hoisington et al. |
| 2009/0114761 A1 | 5/2009 | Sells |
| 2009/0191019 A1 | 7/2009 | Billings |
| 2009/0194638 A1 | 8/2009 | Dennis |
| 2009/0224097 A1* | 9/2009 | Kariv .................. B64F 1/06 244/63 |
| 2009/0236470 A1* | 9/2009 | Goossen ............. B64C 39/024 244/115 |
| 2009/0294584 A1* | 12/2009 | Lovell .................. B63B 27/10 244/110 F |
| 2009/0314883 A1* | 12/2009 | Arlton .................. B64C 39/024 244/63 |
| 2010/0181424 A1 | 7/2010 | Goossen |
| 2010/0237183 A1 | 9/2010 | Wilson et al. |
| 2010/0243799 A1 | 9/2010 | Al-Qaffas |
| 2010/0318475 A1 | 12/2010 | Abrahamson |
| 2012/0210853 A1 | 8/2012 | Abershitz |
| 2012/0223182 A1 | 9/2012 | Gilchrist, III |
| 2013/0082137 A1 | 4/2013 | Gundlach et al. |
| 2015/0129716 A1 | 5/2015 | Yoffe |
| 2015/0166177 A1 | 6/2015 | Bernhardt |
| 2016/0114906 A1 | 4/2016 | McGeer et al. |
| 2016/0137311 A1 | 5/2016 | Peverill et al. |
| 2016/0144980 A1 | 5/2016 | Kunz et al. |
| 2016/0152339 A1 | 6/2016 | von Flowtow |
| 2016/0264259 A1 | 9/2016 | Dickson et al. |
| 2016/0327945 A1 | 11/2016 | Davidson |
| 2016/0375981 A1 | 12/2016 | McDonnell |
| 2017/0225784 A1 | 8/2017 | Kunz et al. |
| 2017/0369185 A1 | 12/2017 | Grub |
| 2018/0162528 A1 | 6/2018 | McGrew et al. |

FOREIGN PATENT DOCUMENTS

| | | | |
|---|---|---|---|
| CN | 101549754 | 10/2009 | |
| CN | 102384702 | 3/2012 | |
| DE | 4301671 A1 | 7/1993 | |
| DE | 19602703 A1 | 2/1997 | |
| DE | 102010010508 | 9/2011 | |
| EP | 0742366 A1 | 11/1996 | |
| FR | 854371 | 4/1940 | |
| GB | 1445153 | 8/1976 | |
| GB | 2 080 216 A | 2/1982 | |
| GB | 2093414 | 2/1982 | |
| GB | 2093414 | 9/1982 | |
| GB | 2093414 A * | 9/1982 | ............... B64F 1/02 |
| GB | 2 150 895 A | 7/1985 | |
| GB | 2 219 777 A | 12/1989 | |
| GB | 2231011 | 7/1990 | |
| GB | 2231011 A | 11/1990 | |
| IL | 76726 | 1/1991 | |

(56) References Cited

FOREIGN PATENT DOCUMENTS

| JP | 07-304498 | 11/1995 |
|---|---|---|
| JP | 2008540217 A | 11/2008 |
| WO | WO-00/75014 A1 | 12/2000 |
| WO | WO-01/07318 A1 | 2/2001 |
| WO | 2008015663 | 2/2008 |
| WO | 20008015663 | 2/2008 |
| WO | WO-2008015663 A1 | 2/2008 |
| WO | 2010138265 | 12/2010 |
| WO | WO-2011066400 | 6/2011 |
| WO | WO-2012047677 | 4/2012 |
| WO | WO-2014080386 | 5/2014 |

OTHER PUBLICATIONS

U.S. Appl. No. 15/787,502, filed Oct. 18, 2017, Dickson et al.
U.S. Appl. No. 15/892,701, filed Feb. 9, 2018, Kunz et al.
Federal Public Service Ministy of Economy National Institute of Industrial Property, "Search Report," in connection with International Patent Application No. PCTUS2010/032314, dated Aug. 22, 2019, 8 pages. Rough English machine translation included.
IP Australia, "Patent Examination Report No. 2," issued in connection with Australian Patent Application No. 2018202891, dated Aug. 12, 2019, 5 pages.

\* cited by examiner

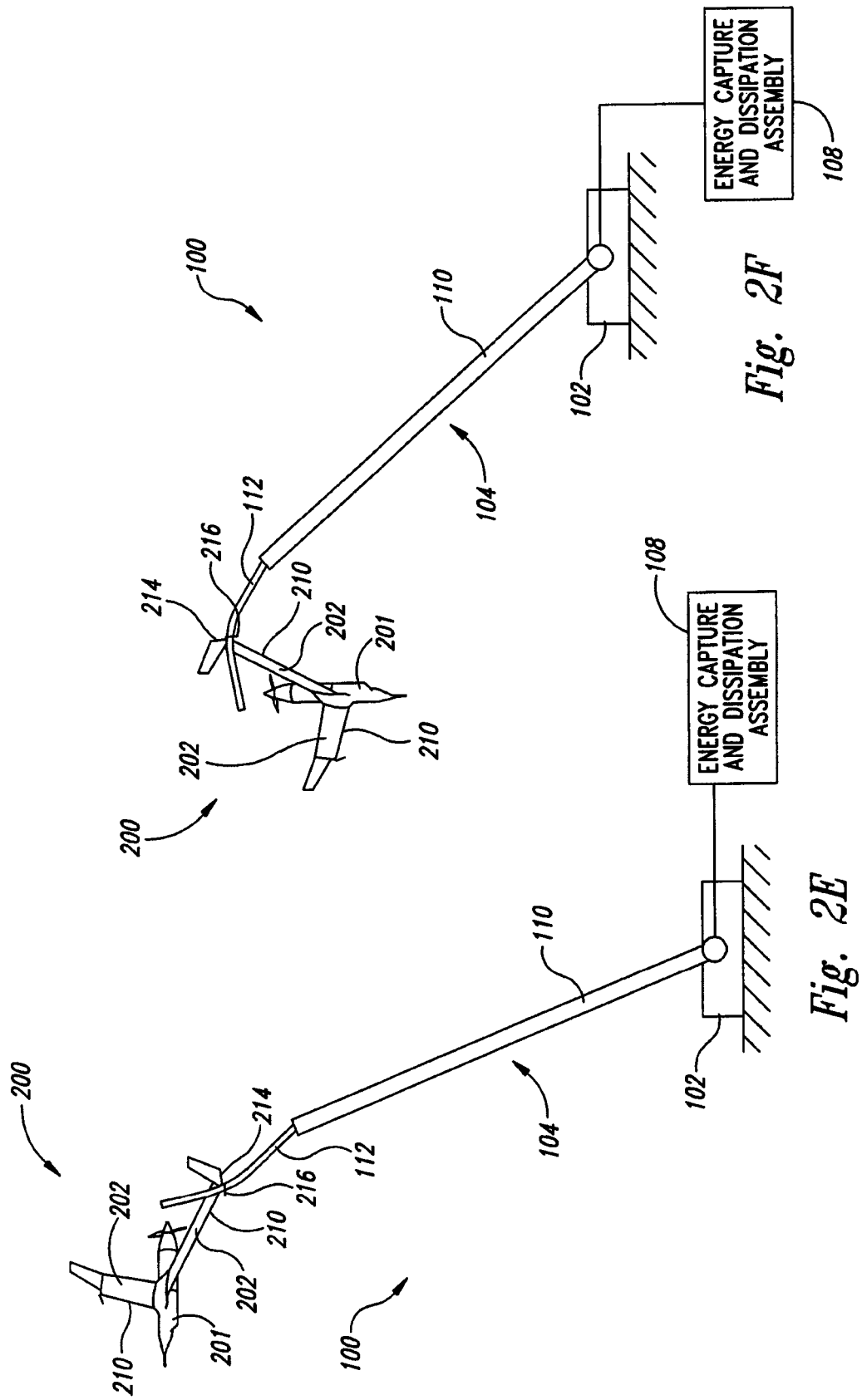

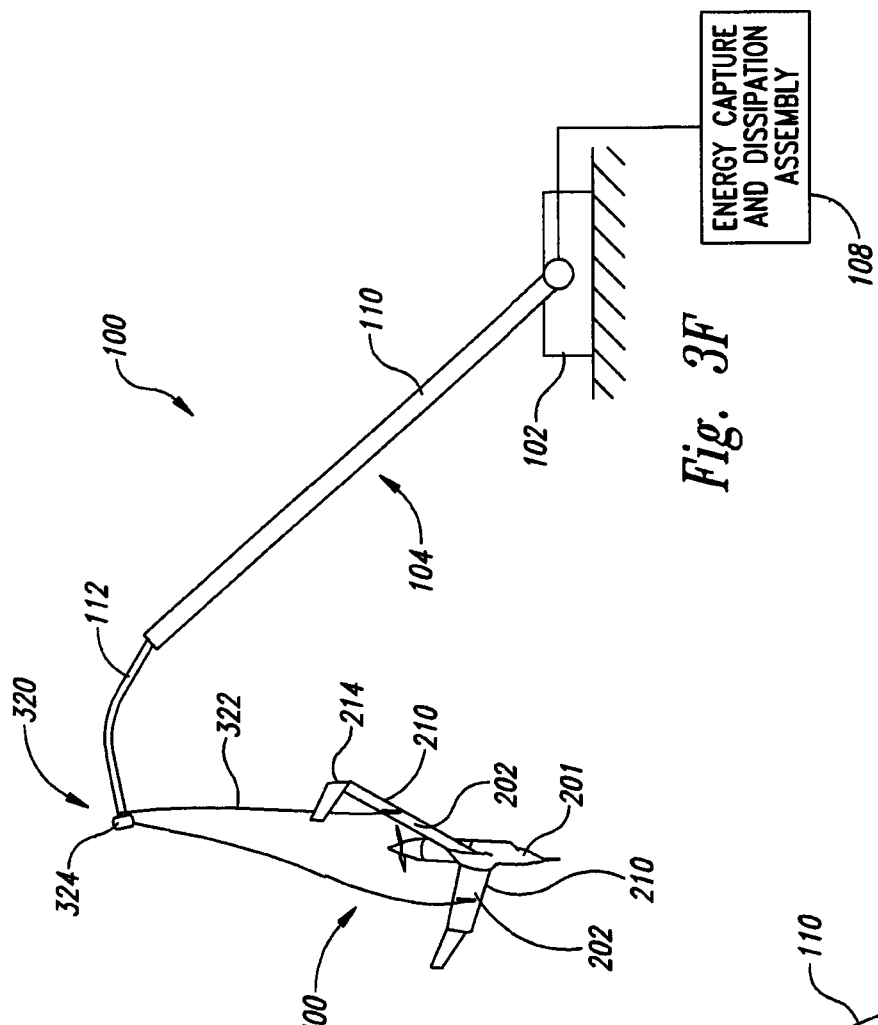
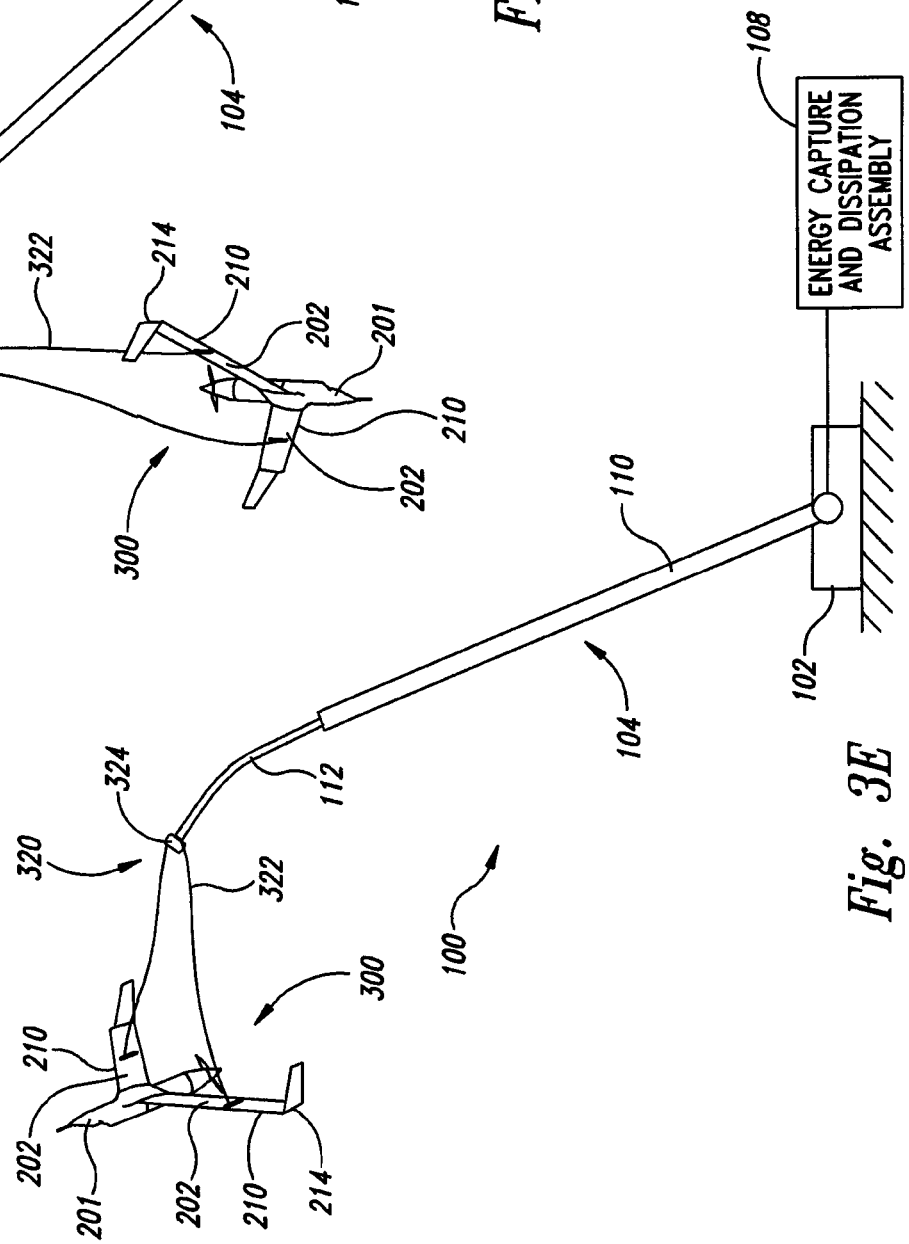

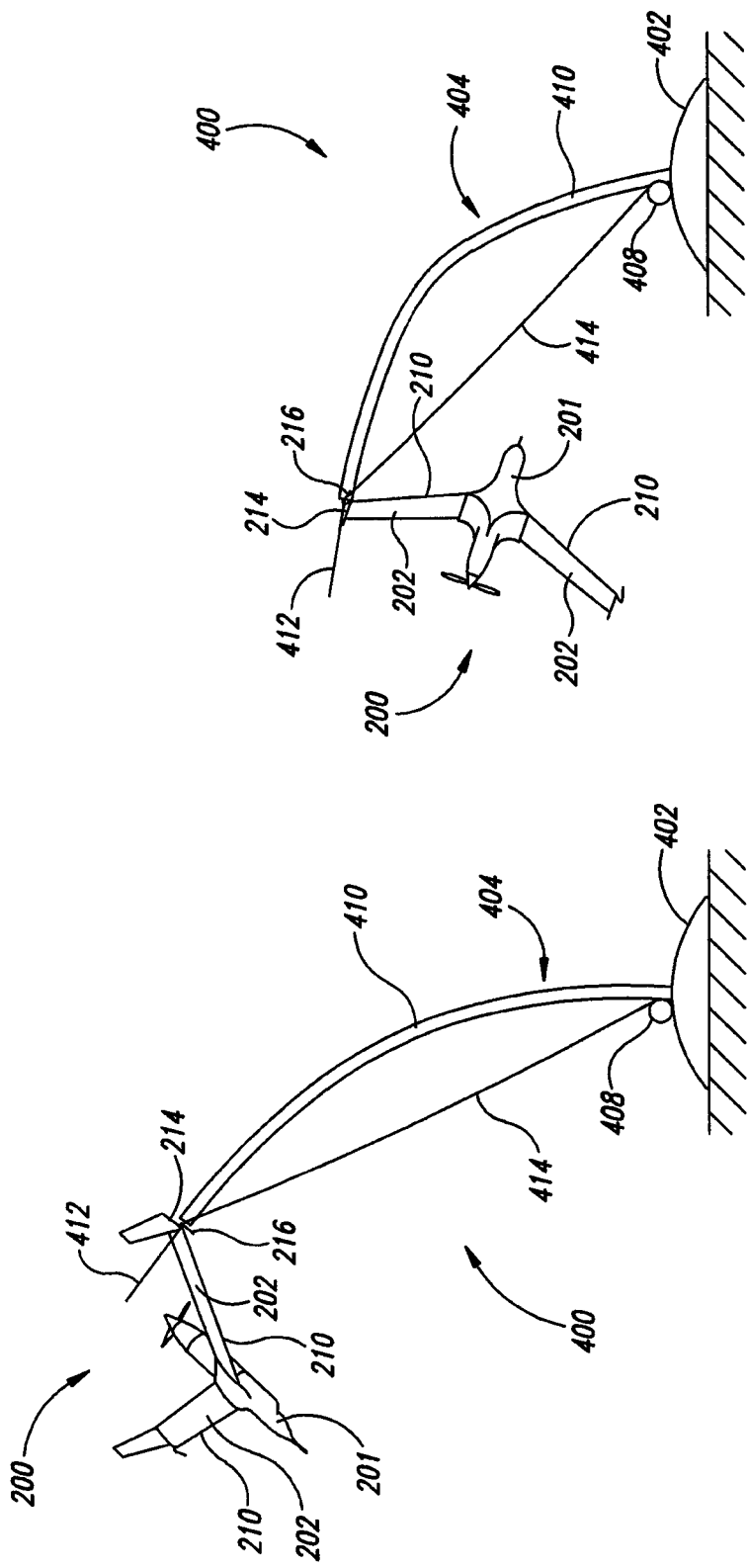

SYSTEMS AND METHODS FOR RECOVERING AND CONTROLLING POST-RECOVERY MOTION OF UNMANNED AIRCRAFT

CROSS-REFERENCE TO RELATED APPLICATION

The present application is a continuation of U.S. patent application Ser. No. 13/279,148, filed Oct. 21, 2011, entitled SYSTEMS AND METHODS FOR RECOVERING AND CONTROLLING POST-RECOVERY MOTION OF UNMANNED AIRCRAFT, which is a continuation of International Application Serial No. PCT/US10/32314, filed Apr. 23, 2010, entitled SYSTEMS AND METHODS FOR RECOVERING AND CONTROLLING POST-RECOVERY MOTION OF UNMANNED AIRCRAFT, which claims the benefit of U.S. Provisional Patent Application No. 61/172,663, filed Apr. 24, 2009, entitled SYSTEMS AND METHODS FOR RECOVERING AND CONTROLLING POST-RECOVERY MOTION OF UNMANNED AIRCRAFT, each of which is incorporated herein in its entirety by reference.

TECHNICAL FIELD

The present disclosure relates generally to systems and methods for recovering unmanned aircraft and controlling post-recovery motion of the aircraft.

BACKGROUND

Unmanned aircraft or air vehicles (UAVs) provide enhanced and economical access to areas where manned flight operations are unacceptably costly and/or dangerous. For example, unmanned aircraft outfitted with remotely operated movable cameras can perform a wide variety of surveillance missions, including spotting schools of fish for the fisheries industry, monitoring weather conditions, providing border patrols for national governments, and providing military surveillance before, during, and/or after military operations.

Many unmanned aircraft systems (which can include the aircraft itself along with launch devices and recovery devices), however, can be difficult to install and operate in cramped quarters, such as the deck of a small fishing boat, land vehicle, or other craft. Accordingly, operating such aircraft systems often includes retrieving or capturing the aircraft with a flexible recovery line when space is insufficient for a normal landing run. While this technique has proven successful in many instances, there is a continual need to improve the effectiveness of systems with which aircraft are recovered.

BRIEF DESCRIPTION OF THE DRAWINGS

FIGS. 2A-2F are partially schematic illustrations of a system and method for recovering an unmanned aircraft in flight and controlling post-recovery motion of the aircraft in accordance with an embodiment of the disclosure.

FIGS. 3A-3F are partially schematic illustrations of a system and method for recovering an unmanned aircraft in flight and controlling post-recovery motion of the aircraft in accordance with another embodiment of the disclosure.

FIGS. 4A-4D are partially schematic illustrations of a system and method for recovering an unmanned aircraft in flight and controlling post-recovery motion of the aircraft in accordance with still another embodiment of the disclosure.

DETAILED DESCRIPTION

The present disclosure describes systems and methods for recovering unmanned aircraft and controlling post-recovery motion of the aircraft. Many specific details of certain embodiments of the disclosure are set forth in the following description and in FIGS. 1-5C to provide a thorough understanding of these embodiments. Well-known structures, systems, and methods often associated with such systems have not been shown or described in detail to avoid unnecessarily obscuring the description of the various embodiments of the disclosure. In addition, those of ordinary skill in the relevant art will understand that additional embodiments may be practiced without several of the details described below.

Figure 1:
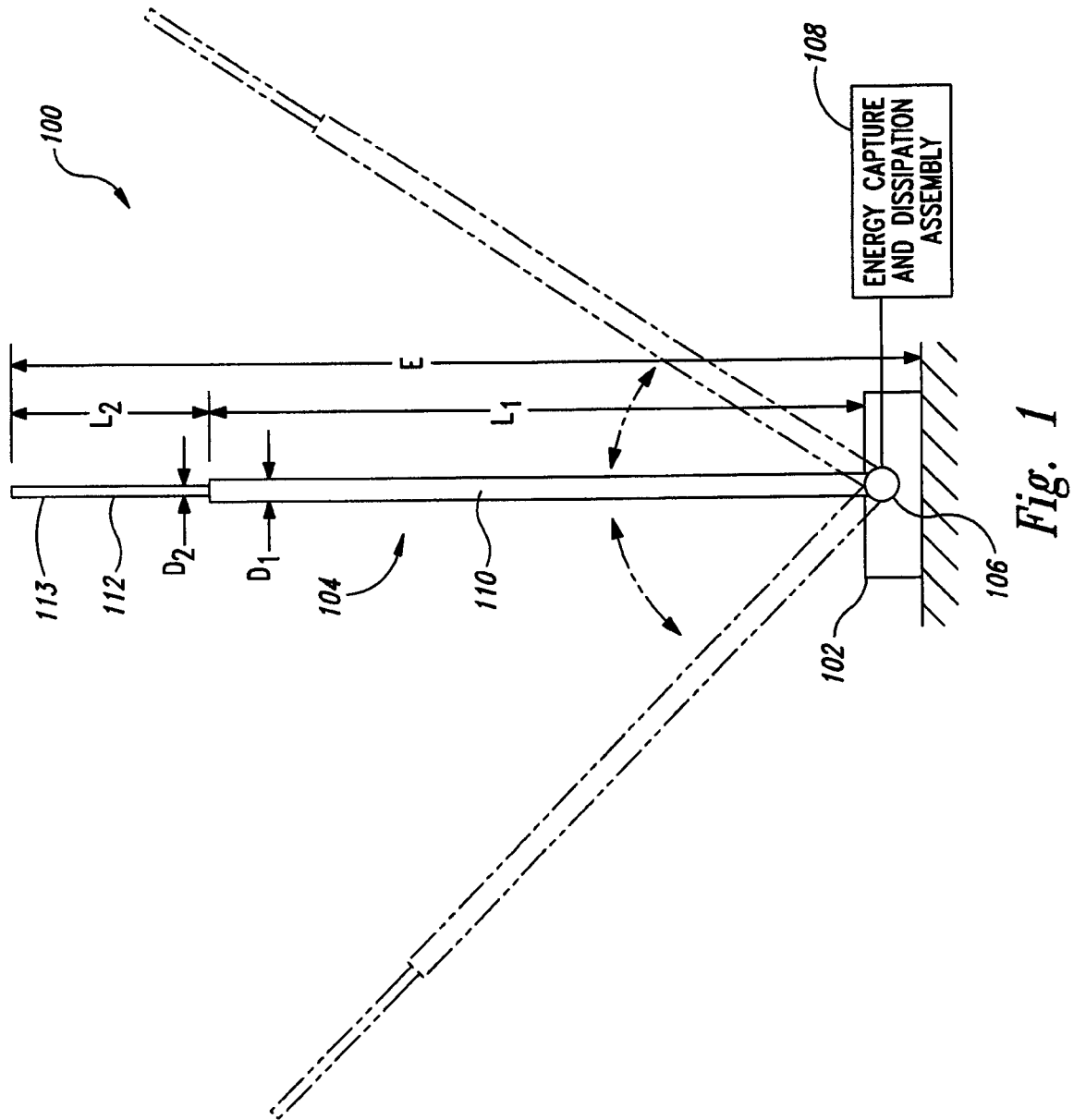
FIG. 1 is a partially schematic illustration of a system configured to recover an unmanned aircraft in flight and control post-recovery motion of the aircraft in accordance with an embodiment of the disclosure.

A. Embodiments of Systems and Methods for Recovering and Controlling Post-Recovery Motion of Unmanned Aircraft FIG. 1 is a partially schematic illustration of an aircraft recovery system 100 configured to intercept and recover an unmanned aircraft (not shown) in flight and control post-recovery motion of the aircraft in accordance with an embodiment of the disclosure. The aircraft recovery system 100 can include, for example, a base portion 102 (shown schematically) and an elongated flexible rod or aircraft capture member 104 attached to the base portion 102. In the illustrated embodiment, the flexible rod 104 has a first end movably coupled to the base portion 102 via an attachment member or joint 106, and a second free end positioned to intercept the aircraft. The joint 106 is configured to allow the flexible rod 104 to pivot (as shown in broken lines) relative to the base portion 102 before, during, and after intercepting the unmanned aircraft in flight. The system 100 further includes an energy capture and dissipation assembly 108 (shown schematically) operably coupled to the flexible rod 104. When an aircraft impacts the aircraft recovery system 100, the flexible rod 104 releasably captures the aircraft and the system 100 is configured to absorb and dissipate the aircraft's landing forces and recover the aircraft. Once captured, the aircraft can be suspended from the flexible rod 104 by one of its wings or another suitable component of the aircraft, or by a capture line carried by the aircraft. Further details regarding the aircraft recovery system 100 and use of the system 100 to recover and control post-recovery motion of aircraft are described below with reference to FIGS. 2A-5C.

The base portion 102 can include a wide variety of different structures (e.g., generally rigid, semi-rigid, and/or inflatable) configured to support the flexible rod 104 during capture and recovery operations. In general, the base portion 102 is configured to (a) hold the flexible rod 104 at a desired position before capture operations (e.g., canted or angled relative to the ground and toward the aircraft), and (b) support the flexible rod 104 during capture and recovery to help prevent the aircraft and its components from hitting the ground or surrounding structures with excessive force. The base portion 102 is configured to rest on the ground or a suitable support platform (e.g., a truck or other suitable land vehicle, a boat or other water vessel, a building, or other suitable vehicles and/or structures). In other embodiments, the base portion 102 can have a different arrangement and/or can be composed of different materials. Moreover, the base portion 102 may not be included in some embodiments. In such instances, the flexible rod 104 may be supported using other suitable support assemblies and/or may be a self-supporting component.

The flexible rod 104 can include a first portion 110 and a second portion 112 at a distal end of the first portion 110. The first and second portions 110 and 112 are aligned with each other (at least initially before capture and recovery operations) and extend along a longitudinal axis of the flexible rod 104. In the illustrated embodiment, the first and second portions 110 and 112 are integral with each other. In other embodiments, however, the first and second portions 110 and 112 may be separate components that are fixedly or releasably attached or mated together. In one embodiment, for example, the individual portions of the flexible rod 104 may be coupled together via a resilient line or cable (e.g., an elastic cord). Moreover, the individual portions of the flexible rod 104 may have a telescoping or articulating arrangement relative to each other. In still other embodiments, the flexible rod 104 may not include separate portions, or the flexible rod 104 may include three or more discrete portions.

The first portion 110 and the second portion 112 can have a variety of different dimensions and configurations depending upon the desired operational requirements. In the illustrated embodiment, for example, the first portion 110 has a first cross-sectional dimension $D_1$ and a first length $L_1$, and the second portion 112 has a second cross-sectional dimension $D_2$ and a second length $L_2$ less than the first cross-sectional dimension $D_1$ and the first length $L_1$, respectively. In other embodiments, however, the first and second portions 110 and 112 may have a different arrangement relative to each other. For example, the first and second portions 110 and 112 may have the same cross-sectional dimension and/or the second portion 112 may have a different length relative to the first portion 110.

In another aspect of this embodiment, a distal portion of the flexible rod 104 can be positioned at an elevation E above the local surface (e.g., the ground shown in FIG. 1). The elevation E can vary based upon the configuration of the flexible rod 104, the configuration of the aircraft (not shown), and the local environment. One feature of the system 100 is that the elevation E only needs to be as high as the anticipated capture elevation. Thus, the overall length of the flexible rod 104 can be significantly less than many existing aircraft capture devices that require much greater deployment elevations. An advantage of this feature is that the flexible rod 104 may be easier to store and/or transport than larger, existing aircraft capture systems. Moreover, the aircraft may be easier to retrieve after capture because of the reduced capture elevation.

The flexible rod 104 can be composed of a carbon fiber material, a carbon graphite material, fiberglass, other composite materials (e.g., carbon/graphite or graphite/boron composites), bamboo, or another suitable material having the desired material characteristics. The selected material, for example, should have the strength and flexibility to intercept and capture an aircraft when it flies into the flexible rod 104 and, once captured, to suspend the aircraft by one of its wings or another suitable capture mechanism carried by the aircraft. In one particular aspect of this embodiment, the first portion 110 has a first stiffness and the second portion 112 has a second stiffness less than the first stiffness. The second portion 112 is accordingly more flexible than the first portion 110 and is configured to bend or flex more than the first portion 110 during operation. Further details regarding this feature are described below with reference to FIGS. 2A-2F. In other embodiments, however, the first and second portions 110 and 112 may have the same or approximately the same stiffness. In still other embodiments, the first and/or second portions 110 and 112 may be composed of one or more materials having different qualities and/or characteristics than those discussed above.

In several embodiments, at least part of the second portion 112 of the flexible rod 104 may be covered or coated with a relatively soft, rope-like material 113 or other suitable material configured to provide enhanced grip for the hook portion carried by the aircraft. The material, for example, can be relatively soft, flexible sheath over a desired part of the second portion 112 or an external coating or layer applied directly onto the second portion 112 of the flexible rod 104. The sheath or external coating is expected to reduce and/or inhibit slipping of the hook portion of the aircraft during capture, and is also expected to strengthen the second portion 112 and make the flexible rod 104 more resilient in tension along a longitudinal axis of the flexible rod 104. In other embodiments, one or more additional parts of the flexible rod 104 (e.g., at least part of the first portion 110) may include the sheath or coating. In still other embodiments, the first and/or second portions 110 and 112 may include one or more ridges or protrusions positioned to prevent or inhibit the hook from the aircraft from slipping off the flexible rod 104. The sheath/coating/ridges, however, are optional features that may not be included in some embodiments.

The energy capture and dissipation assembly 108 can include a hydraulic damper, a pneumatic damper, plastically deforming material(s), a passive takeup reel, a brake, or other suitable damping devices configured to dissipate the aircraft's kinetic energy. One feature of the energy capture and dissipation assembly 108 is that the assembly is expected to provide precise control of the forces associated with capture and recovery of the aircraft. Accordingly, recovery and energy management can be closely controlled throughout the capture and recovery process. This feature is expected to help inhibit and/or prevent damage to the aircraft during capture operations. In other embodiments, the energy capture and dissipation assembly can have a different configuration and/or include different features. In still other embodiments, the system 100 does not include the energy capture and dissipation assembly 108.

In operation, the system 100 can be deployed to a desired location and configured as the primary device for capture and recovery operations. The system 100, for example, may be a modular system and an operator can transport the system components in a generally disassembled or partially assembled state to a landing zone and assemble the components on-site. In another embodiment, however, the system 100 may be transported to the desired landing zone in a generally assembled configuration.

The aircraft recovery system 100 is a scalable system that can be used as a primary aircraft recovery system for a variety of different aircraft configurations and/or arrangements. For example, as mentioned above, the flexible rod 104 can have an overall length and cross-sectional dimension based, at least in part, on the particular dimensions of the aircraft to be recovered, the operational conditions of the aircraft, and/or the operational considerations of the system 100 (e.g., the location of the system 100, the desired transportability of the system 100, etc.).

Figure 2A:
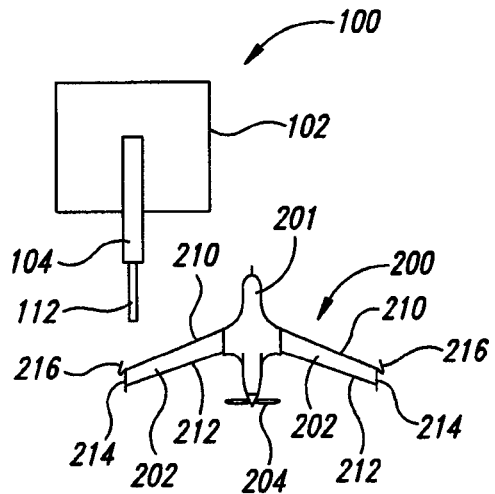
Figure 2B:
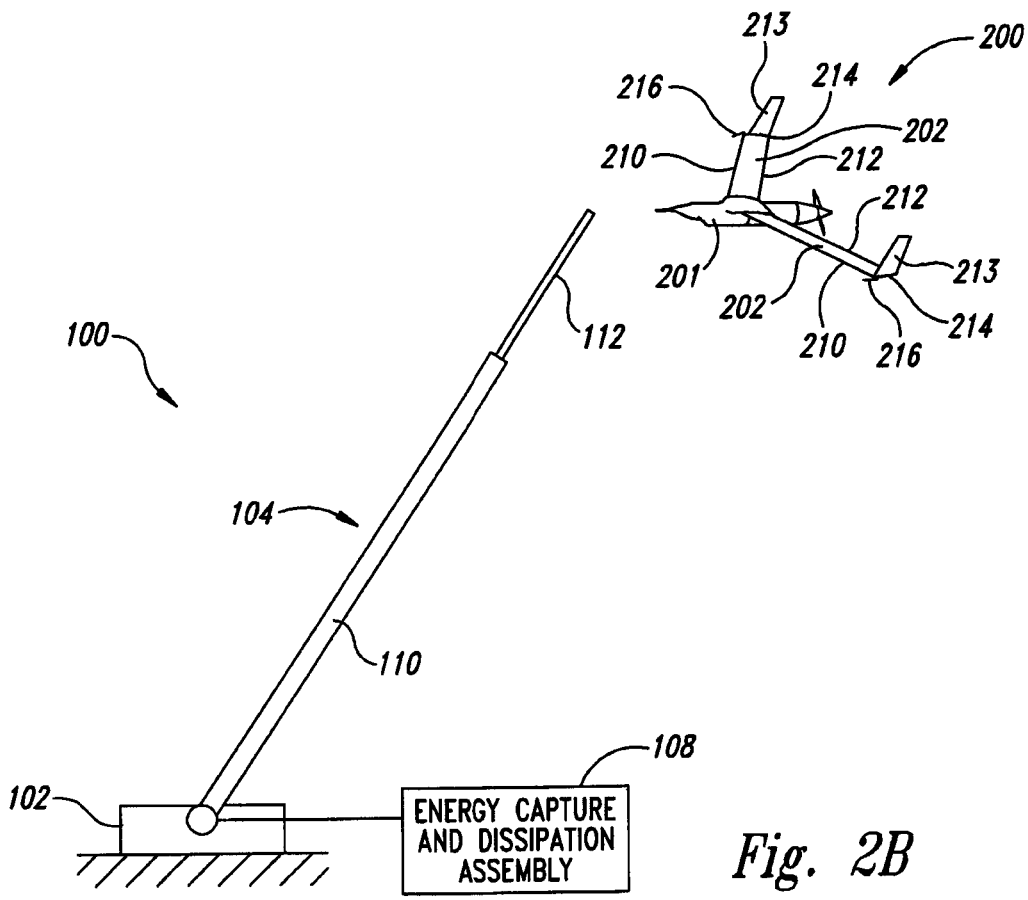

FIGS. 2A-2F are partially schematic illustrations of the system 100 recovering an unmanned aircraft 200 in flight and controlling post-recovery motion of the aircraft 200 in accordance with an embodiment of the disclosure. FIGS. 2A and 2B, for example, are a top view and a side view, respectively, of the aircraft 200 approaching the system 100 before capture. The aircraft 200 can include a fuselage 201, a pair of wings or lifting surfaces 202 extending outwardly from the fuselage 201, and a propeller 204 positioned at the aft end of the fuselage 201 to propel the aircraft 200 during flight. The individual wings 202 include a leading edge 210, a trailing edge 212, and an outboard edge 214. Each wing 202 can also include an upwardly extending winglet 203 at the outboard edge 214 for lateral stability and control. The aircraft 200 further includes an engagement or capture device 216 at the outboard edge 214 of each wing 202. In other embodiments, the engagement device 216 may have a different configuration and/or may be positioned at another suitable location on the aircraft 200. In addition, the aircraft 200 may include a different number of engagement devices 216.

In this embodiment, the flexible rod 104 is angled or canted toward the aircraft 200. One advantage of this arrangement is that it can provide a larger range of movement for the flexible rod 104 after capture of the aircraft 200. In other embodiments, however, the flexible rod 104 may have a generally vertical arrangement or another arrangement relative to the aircraft's local flight path and the local surface (e.g., the ground shown in FIG. 2B).

Figure 2D:
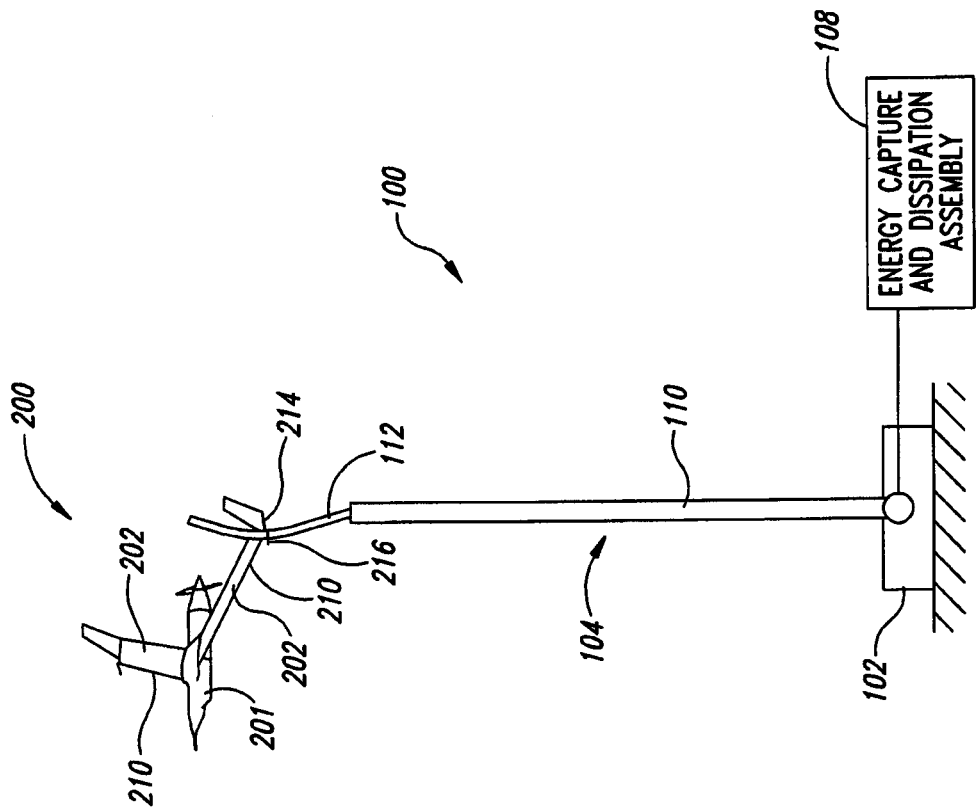
Figure 2C:
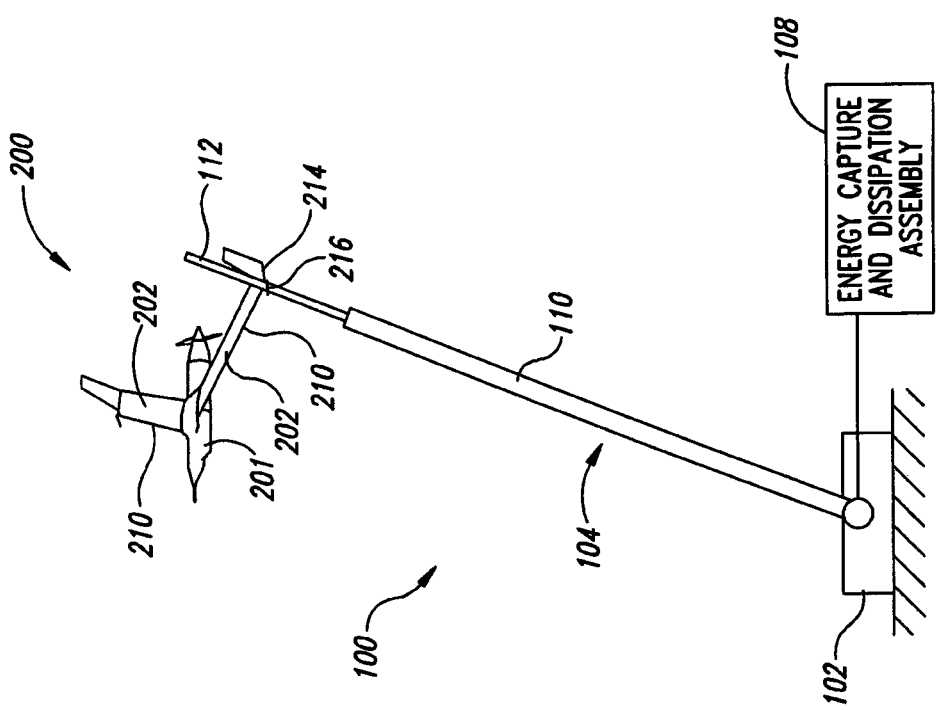

Referring next to FIG. 2C, the aircraft 200 intercepts the free end of the flexible rod 104 and the second portion 112 of the flexible rod 104 and the leading edge 210 of one of the wings 202 slide relative to each other toward the corresponding engagement device 216. Referring now to FIG. 2D, the engagement device 216 at the outboard edge 214 of the wing 202 receives and retains part of the second portion 112 of the flexible rod 104, thus causing the aircraft 200 to begin to yaw or rotate toward the flexible rod 104. The force of impact with the aircraft 200 also causes the flexible rod 104 to pivot or move relative to the base portion 102. In FIG. 2D, for example, the flexible rod 104 has moved from its initial angled or canted arrangement to a generally vertical position. Moreover, the second portion 112 of the flexible rod 104 has begun to flex or bend in response to the aircraft's momentum. It will also be appreciated that the first portion 110 of the flexible rod 104 may also flex or bend during capture operations. Moreover, in some embodiments the base 102 may also be configured to move or articulate in a predetermined manner to help absorb the energy of impact.

Referring now to FIG. 2E, the recovery process continues with the flexible rod 104 continuing to pivot or move relative to the base portion 102 in response to the aircraft's momentum. In FIG. 2E, for example, the flexible rod 104 has moved past the generally vertical arrangement and is now angled or canted away from the aircraft's incoming flight path. The second portion 112 continues to flex or bend in response to the landing forces from the aircraft 200. As the aircraft 200 rapidly decelerates, the forces are transferred from the aircraft 200 to the flexible rod 104 and, in turn, to the energy capture and dissipation assembly 108. In this way, the system 100 can absorb a significant amount of the aircraft's landing forces. Moreover, because the stresses on the aircraft 200 during capture operations are primarily exerted on the wing structures during impact, the delicate components (e.g., turret, pitot tubes, etc.) at a nose portion of the aircraft 200 and the other fragile portions of the aircraft 200 experience few or no stresses during capture and recovery operations.

Referring to FIG. 2F, the aircraft 200 has come to a complete or approximately complete stop and remains secured to the flexible rod 104. As mentioned previously, the assembly 108 is configured to provide precise control of the forces associated with capture and recovery of the aircraft 200, and help inhibit, reduce, and/or eliminate damage to the aircraft 200 during capture operations. In the illustrated embodiment, for example, the aircraft 200 is suspended above the ground and away from other external structures after capture, and can be quickly and easily retrieved from the flexible rod 104 by ground personnel (not shown).

One feature of embodiments of the system 100 and methods described above with reference to FIGS. 1-2F is that the system 100 can be quickly deployed and configured for landing operations in a variety of different environments and operational conditions. Many conventional recovery systems, for example, require elaborate and complex components that are relatively immobile and require a significant amount time and expense to deploy. In contrast with such conventional systems, the system 100 is a modular system that can be easily transported in a partially assembled or disassembled state to a wide variety of different operational environments, and quickly assembled and deployed for landing operations with minimal manpower. In addition, because the system 100 has a much smaller footprint than many conventional systems, the system 100 can be used in a wide variety of different operational environments and conditions where use of many conventional systems may be impracticable. Moreover, the aircraft 200 can be quickly recovered from the system 100 after landing operations and prepared for storage and/or another mission.

Another feature of embodiments of the system 100 described above is that they can be used to recover aircraft having a variety of different configurations in addition to the aircraft 200 described above with reference to FIGS. 2A-2F. One advantage of this feature is that the system 100 can be used with existing fleets of unmanned aircraft without requiring expensive and/or time-consuming modifications to such aircraft. Furthermore, because the system 100 can be used with a variety of different aircraft, a single system 100 may be deployed and used for landing operations in a particular area or region for an entire fleet of different unmanned aircraft.

Figures 3A, 3B:
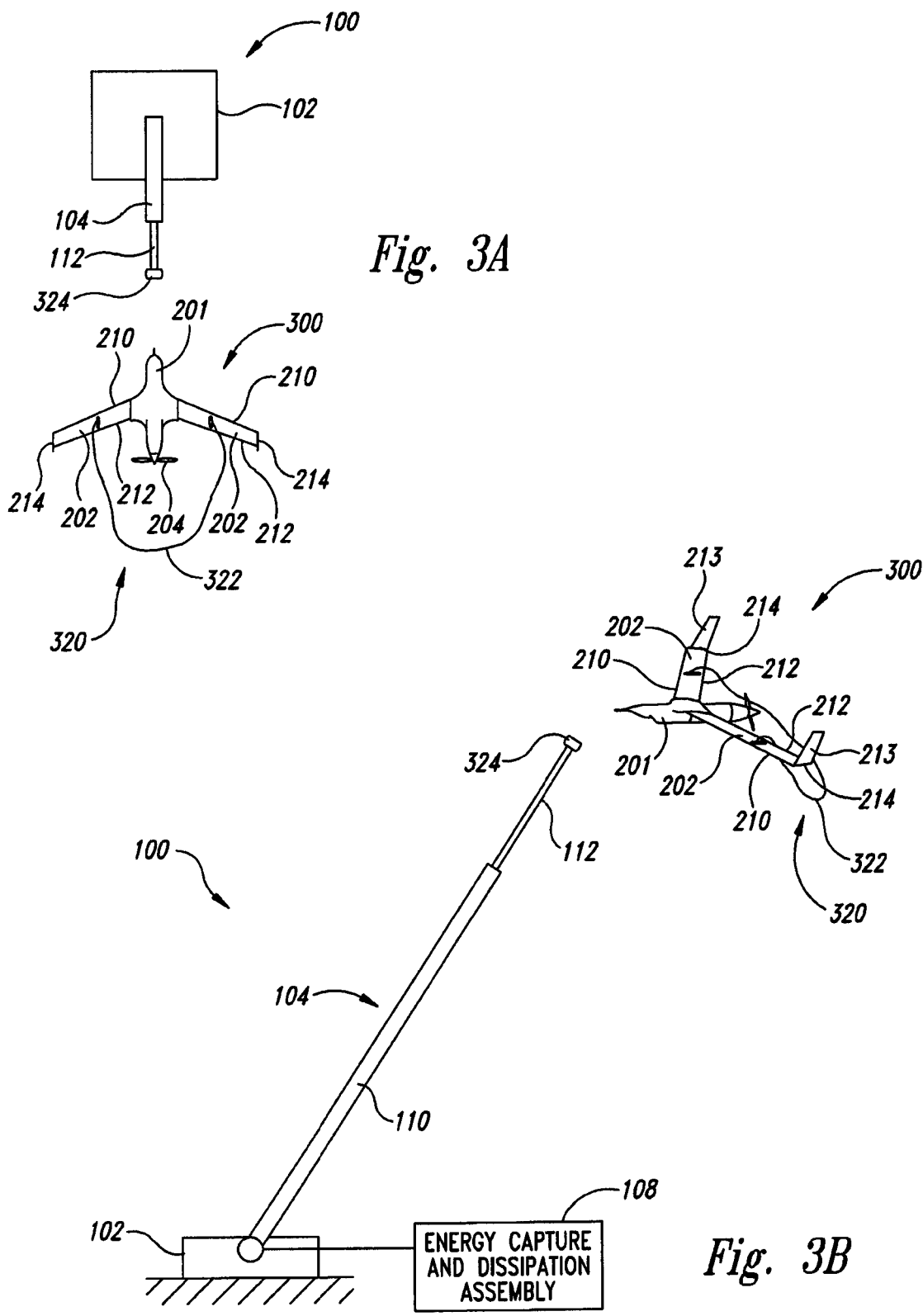

FIGS. 3A-3G are partially schematic illustrations of the system 100 recovering an unmanned aircraft 300 in flight and controlling post-recovery motion of the aircraft 300 in accordance with another embodiment of the disclosure. FIGS. 3A and 3B, for example, are a top view and a side view, respectively, of the aircraft 300 approaching the system 100 before capture. The methods described below with reference to FIGS. 3A-3G differ from the techniques described above in that the aircraft 300 has a different configuration than the aircraft 200. More specifically, rather than intercepting the flexible rod 104 with a wing of the aircraft as described above with reference to FIGS. 2A-2D, the aircraft 300 includes a capture assembly 320 configured to engage or hook onto a portion of the flexible rod 104 and capture the aircraft 300.

The capture assembly 320 can include, for example, one or more deployable flexible support lines 322 (e.g., ropes or cables) attached to each wing 202 and positioned to engage the free end of the flexible rod 104. In the illustrated embodiment, the support line 322 is attached to a top portion of each wing 202 at least proximate to a lateral axis through a center of gravity (CG) of the aircraft 300. As discussed in greater detail below, attaching the support line 322 along the lateral axis through the CG of the aircraft 300 can cause the aircraft 300 to pitch up during recovery and can help provide additional deceleration during such operations. The capture assembly 320 can also include an engagement feature 324 (e.g., a hook, etc.) carried by the flexible rod 104 and positioned to releasably engage the support line 322. In other embodiments, the engagement feature 324 can include different features and/or have a different arrangement. In at least some embodiments, the support line 322 may also include weights or other aerodynamic features (not shown) to help the support line 322 maintain proper shape and position in flight relative to the aircraft 300 and the engagement feature 324.

One feature of the capture assembly 320 is that the support line 322 is attached to each wing 202 at natural strong points of the wings 202. Such points are already designed to withstand significant loads and, accordingly, additional wing and/or fuselage support structures are not expected to be necessary to withstand the forces associated with capture and recovery of the aircraft 300. Moreover, the aircraft's control surfaces and other fragile portions of the aircraft 300 experience few or no stresses during capture operations.

Figure 3D:
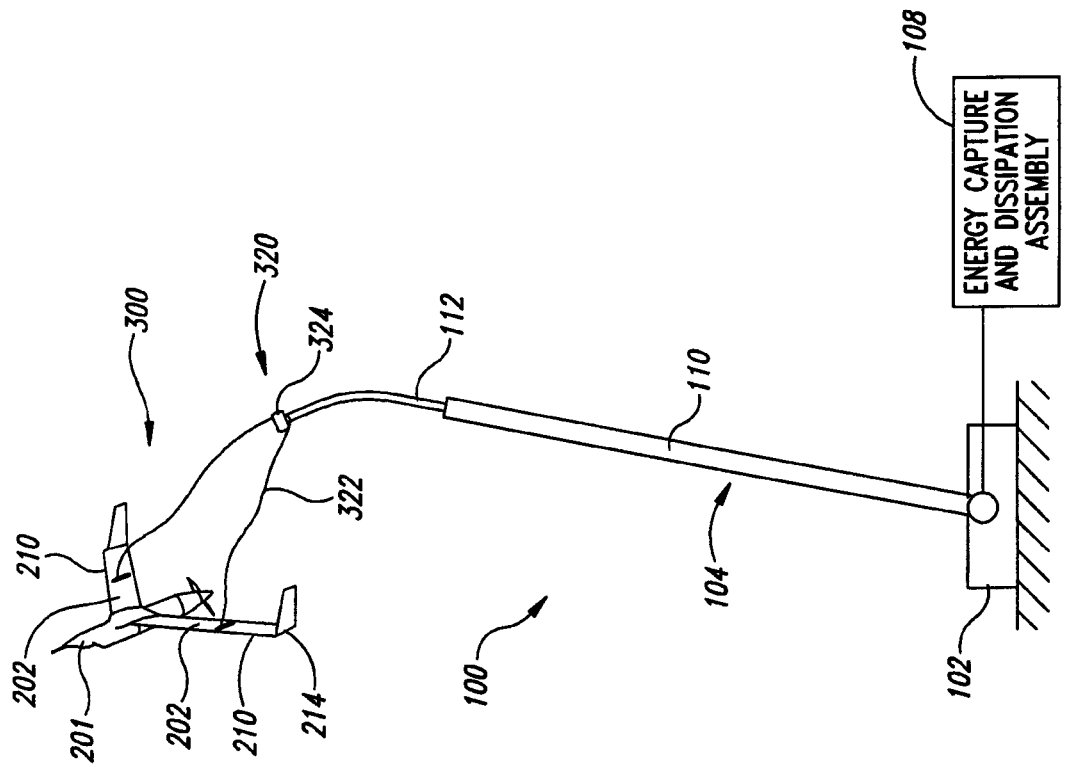
Figure 3C:
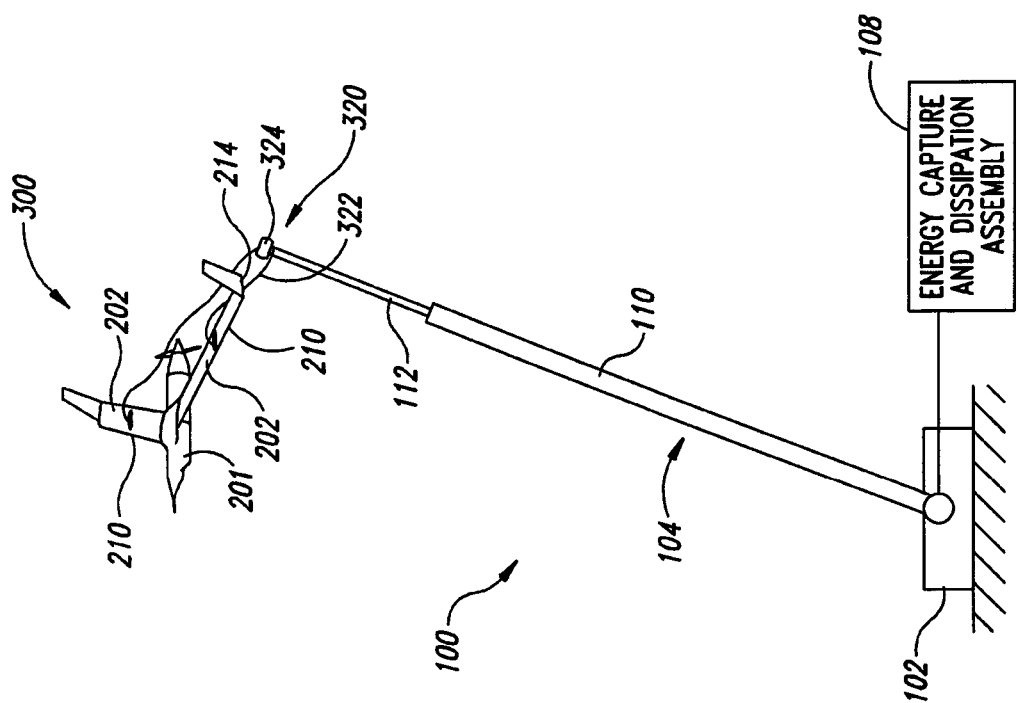

Referring next to FIG. 3C, the support line 322 intercepts and engages the second portion 112 of the flexible rod 104. The engagement feature 324 receives and retains part of the support line 322, thus securing the aircraft 300 to the flexible rod 104. Referring now to FIG. 3D, the aircraft 300 begins to pitch up and decelerate after capture, thereby moving the flexible rod 104 from its initial angled or canted arrangement to a generally vertical position. As mentioned above, the support line 322 is anchored at least proximate to a lateral axis through a CG of the aircraft 300. Accordingly, after capture of the support line 322 by the flexible rod 104, the momentum of the aircraft 300 causes the aircraft 300 to pitch up to a generally nose-high attitude and hold in a deep stall. One advantage of this feature is that it allows the support line 322 to quickly induce aerodynamic decelerations forces on the aircraft 300, while initially producing upward momentum of the aircraft 300. This feature is expected to help quickly decelerate the aircraft 300 and reduce or minimize the possibility of the aircraft 300 contacting the ground or other external structure during capture operations.

Referring now to FIG. 3E, the recovery process continues with the flexible rod 104 continuing to pivot or move relative to the base portion 102 in response to the aircraft's momentum. The flexible rod 104, for example, is now angled or canted away from the aircraft's incoming flight path. The second portion 112 continues to flex or bend in response to the landing forces from the aircraft 300. As the aircraft 300 rapidly decelerates, the forces from the aircraft 300 are transferred to the flexible rod 104 and the energy capture and dissipation assembly 108. Referring to FIG. 3F, the aircraft 300 has come to a complete or approximately complete stop and remains secured to the flexible rod 104 via the support line 322. The length of the support line 322 can be selected such that the aircraft 300 remains suspended above and out of contact with the ground or other external structure after capture.

FIGS. 4A-4D are partially schematic illustrations of a system 400 configured to recover an unmanned aircraft (e.g., the aircraft 200 or aircraft 300 discussed above) in flight and control post-recovery motion of the aircraft in accordance with still another embodiment of the disclosure. The aircraft recovery system 400 can include several features generally similar to the system 100 described above with reference to FIG. 1. The system 400 can include, for example, a base portion 402 and an elongated flexible rod or aircraft capture member 404 attached to the base portion 402. The flexible rod 404 can include a first portion 410 and a second portion 412 at a distal end of the first portion 410. In the illustrated embodiment, the second portion 412 is an elongated wire attached to an end of the first portion 410. In other embodiments, however, the first portion 410 and/or second portion 412 may be composed of different material(s) and/or have a different arrangement. For example, in some embodiments the flexible rod 404 may not include separate portions, or the flexible rod 404 may include three or more discrete portions.

At least one of the first and second portions 410 and 412 is operably coupled to a tension line or takeup line 414 (shown and described below with reference to FIG. 4B). In the illustrated embodiment, for example, the tension line 414 is attached to the second portion 412 of the flexible rod 404. The system 400 also includes a tension reel 408 operably coupled to the tension line 414 and configured to wind/unwind the tension line 414 during operation. In the illustrated embodiment, the tension reel 408 is carried by the base portion 402 and positioned to wind/unwind the tension line 414. In other embodiments, however, the tension reel 408 can have a different arrangement relative to the other components in the system 400 and/or may include different features. For example, the tension reel 408 may be positioned at a variety of different locations relative to the base portion 402 and/or the flexible rod 404.

Figure 4B:
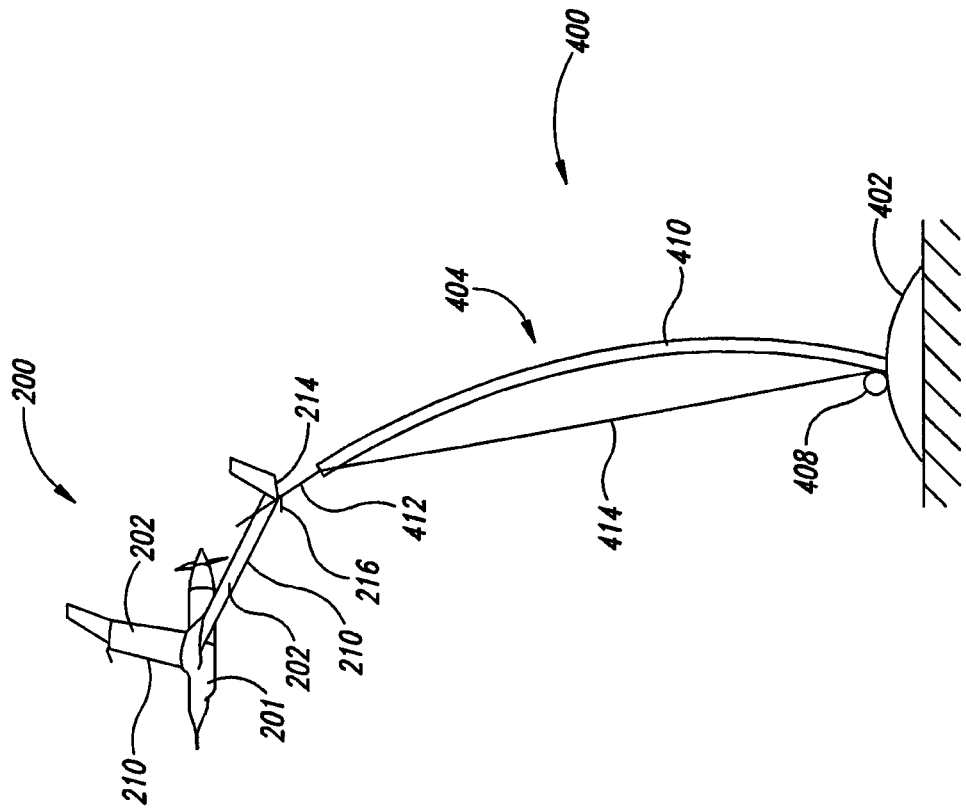
Figure 4A:
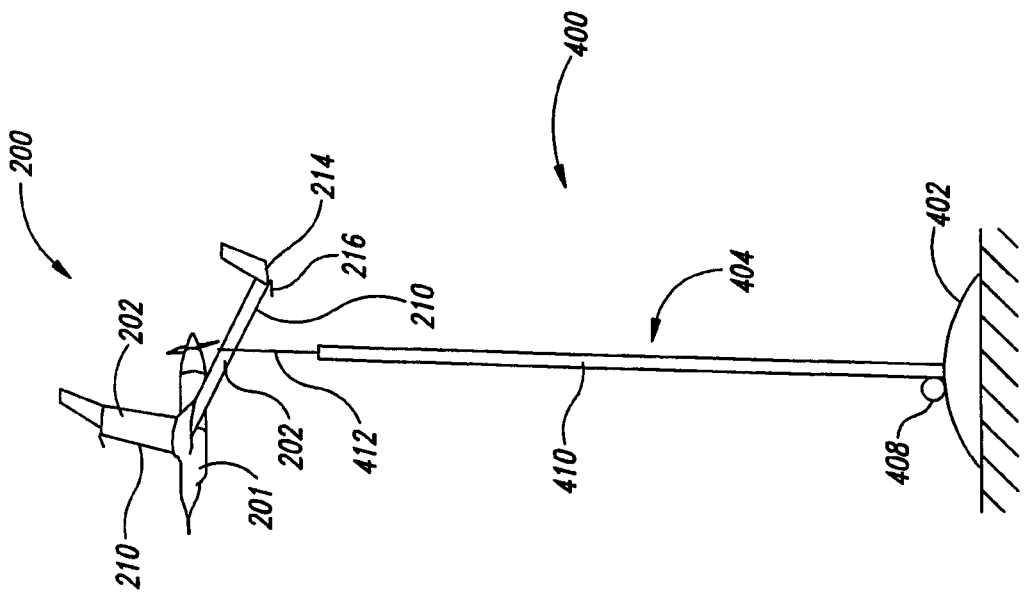

Referring next to FIG. 4B, the aircraft 200 intercepts the flexible rod 404, and the second portion 412 of the flexible rod 404 and the leading edge 210 of one of the wings 202 slide relative to each other toward the corresponding engagement device 216. After the engagement device 216 at the outboard edge 214 of the wing 202 receives and retains part of the second portion 412, the aircraft 200 begins to yaw or rotate about the flexible rod 404. The force of impact with the aircraft 200 also causes the entire flexible rod 404 (both the first and second portions 410 and 412) to bend or bow. As the flexible rod 404 bends, any slack in the tension line 414 is taken up by the tension reel 408. Keeping the tension line 414 relatively taut can help keep the flexible rod 404 in a flexed or bent configuration, and help transfer the momentum and capture forces from the aircraft 200 to the system 400. In other embodiments, the second portion 412 may be at least partially extendable in response to the momentum of the aircraft 200. In one embodiment, for example, the second portion 412 can extend or spool out relative to the first portion 410 a selected distance after impact of the aircraft 200.

Referring now to FIG. 4C, the flexible rod 404 has moved from its initial, generally vertical arrangement to an angled or canted arrangement as the aircraft 200 continues to yaw or pivot about the flexible rod 404. Moreover, the flexible rod 404 continues to flex or bend in response to the forces from the aircraft 200. Referring to FIG. 4D, the aircraft 200 has come to a complete or approximately complete stop and remains secured to the flexible rod 404. The tension line 414 remains generally taut, which can help keep the aircraft 200 suspended above the ground and away from other external structures after capture. In this arrangement, the aircraft 200 can be quickly and easily retrieved from the flexible rod 404 by ground personnel (not shown).

In other embodiments, the systems and methods described above with reference to FIGS. 1-4D can be used in conjunction with aircraft having configurations different than those of the aircraft 200/300 described above. For example, in one embodiment an aircraft can include generally unswept wings. In another embodiment, an aircraft can include delta wings. Further, the aircraft can have propulsion systems that are different than and/or arranged differently than those described above with reference to FIGS. 1-4D. In any of these further embodiments, the aircraft can remain compatible with some or all of the systems and methods above for capturing and controlling post-capture motion of the aircraft.

Figure 5A:
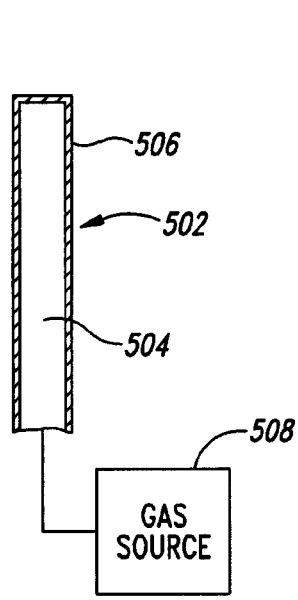
FIG. 5A is a partially schematic illustration of a distal portion of an aircraft capture member configured in accordance with another embodiment of the disclosure.
Figure 5B:
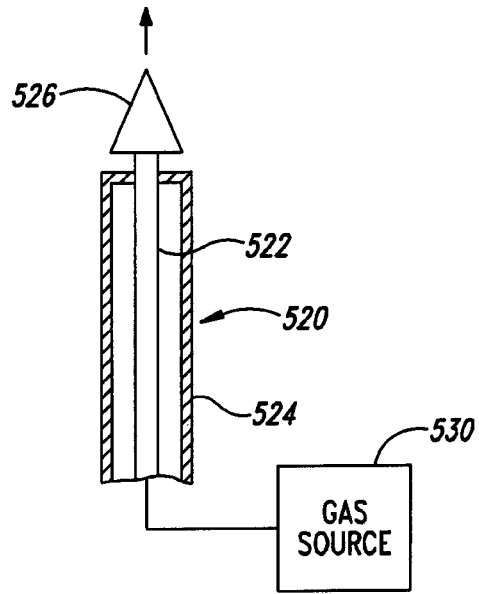
FIG. 5B is a partially schematic illustration of still another embodiment of an aircraft capture member configured in accordance with an embodiment of the disclosure.
Figure 5C:
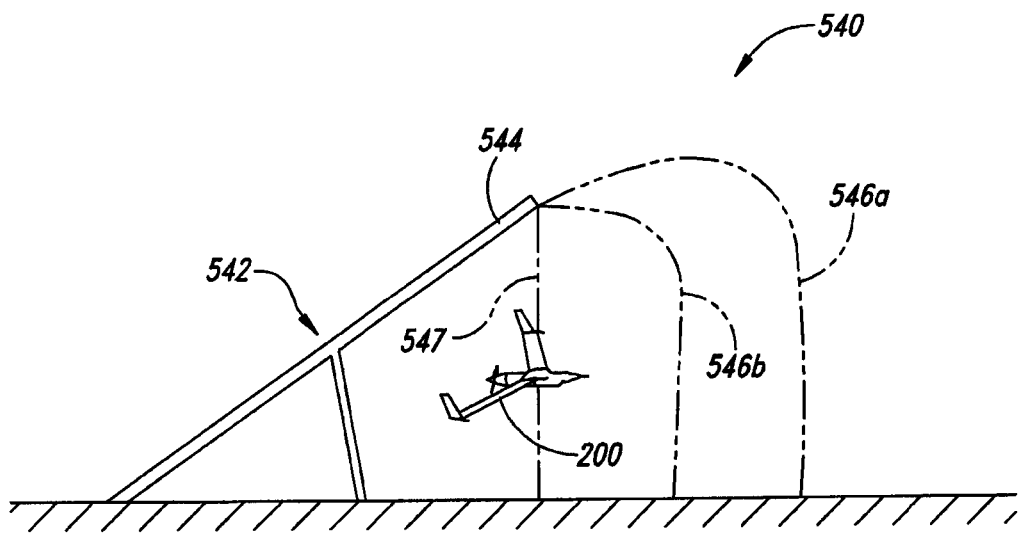
FIG. 5C is a partially schematic illustration of an aircraft recovery system configured in accordance with still yet another embodiment of the disclosure.

FIGS. 5A-5C illustrate elongated aircraft capture members and aircraft recovery systems configured in accordance with other embodiments the disclosure. The aircraft capture members and systems of FIGS. 5A-5C can be used with the aircraft, systems, and methods described above with reference to FIGS. 1-4D. In addition, the aircraft capture members and recovery systems described below can include many of the same features and advantages of the systems and methods described above.

FIG. 5A, for example, is a partially schematic illustration of a distal portion of an elongated flexible rod or aircraft capture member 502 configured in accordance with another embodiment of the disclosure. The aircraft capture member 502 includes an inner inflatable portion 504 and an outer engagement portion or sheath 506 at least partially covering the inner inflatable portion 504. The inflatable portion 504 can include one or more bladders filled to a desired pressure with a gas (e.g., air) using a gas source 508. The pressurized aircraft capture member 502 can accordingly extend in a generally vertical or angled/canted configuration (e.g., similar to the elongated flexible rods or aircraft capture members described above). The outer sheath 506 can be composed of a relatively soft, rope-like material or other suitable material configured to provide better grip for a hook portion carried by the aircraft. The outer sheath 506 is configured to directly engage the aircraft (not shown) during capture operations, as well as protect the inner inflatable portion 504 from damage and/or puncture.

In operation, the aircraft capture member 502 has an initially deflated, non-rigid arrangement (e.g., a deflated balloon). After energizing the gas source 508 and inflating the inner inflatable portion 504 to a desired pressure, the aircraft capture member 502 has a configuration generally similar to the arrangement of the flexible rod 104 of FIG. 1, and can be positioned at a desired orientation (e.g., generally vertical or canted relative to the ground and the aircraft to be captured. In several embodiments, one or more flexible lines, capture devices, and/or engagement members can be carried by or coupled to the aircraft capture member 502 and positioned to releasably engage the aircraft during capture and recovery operations.

FIG. 5B is a partially schematic illustration of still another embodiment of an aircraft capture member 520 configured in accordance with an embodiment of the disclosure. In this embodiment, the aircraft capture member 520 includes an inner tubing or bladder 522 operably coupled to a gas source 530, and an outer engagement portion or sheath 524 at least partially covering the inner tubing 522. The aircraft capture member 520 further includes a thruster 526 coupled to the inner tubing 522 and outer sheath 524. The inner tubing 522 and outer sheath 524 are arranged relative to each other in a telescoping arrangement. In operation, the thruster 526 can be activated (e.g., using the gas source 530) and can pull up or extend the outer sheath 524 to a desired elevation above the local surface (e.g., ground) as the thruster 526 is launched away from its initial position. In this way, the aircraft capture member 520 can have an elongated, generally vertical arrangement (e.g., similar to the flexible rod 104 of FIG. 1) positioned to intercept an aircraft in flight for capture and recovery operations.

FIG. 5C is a partially schematic illustration of an aircraft recovery system 540 configured in accordance with still yet another embodiment of the disclosure. The system 540 includes an elongated flexible rod or aircraft capture member 542 having a first portion 544 and one or more second portions 546 (two are shown in broken lines as 546a and 546b) positioned to intercept an unmanned aircraft in flight. It will be appreciated that the system 540 may include only a single second portion 546, or may include more than two second portions 546 extending from the first portion 542. The second portions 546 can have material characteristics and features generally similar to the second portions 112/412 described above. The system 540 differs from the systems described above in that rather than having an elongated rod or aircraft recovery member with an initial, generally linear and generally vertical arrangement, the second portions 546a and 546b of the system 540 are initially curved or non-linear. Moreover, each of the second portions 546a and 546b has a first end attached to the first portion 544 of the aircraft capture member 542 and a second end attached to the local surface (e.g., the ground) or another suitable structure. In several embodiments, the second ends of the individual second portions 546 may be configured to break free or become detached when the tension in the respective line exceeds a threshold value. In still other embodiments, the second ends of the individual second portions 546 may remain free rather than being attached to the local surface or another structure. After capture and recovery operations, the second portions 546 can reach a final state or arrangement (as shown by line 547) and the aircraft 200 can be retrieved from the line.

From the foregoing, it will be appreciated that specific embodiments of the disclosure have been described herein for purposes of illustration, but that various modifications can be made without deviating from the spirit and scope of the disclosure. For example, the flexible rods described above can have a telescoping arrangement with the second portions (and any additional portions) of the individual rods at least partially received within the first portions in a stowed configuration before or after operation. Further, any of the flexible rods described above can include one or more engagement members (e.g., hooks, loops, multiple loops, etc.) at or near the top portion of the flexible rod and positioned to engage the aircraft directly and/or engage a capture assembly carried by the aircraft. Moreover, although the aircraft capture members described above have a generally upward, vertical orientation, the flexible rods may also be suspended from a suitable support structure in a generally downward orientation for capture and recovery operations.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure. Accordingly, embodiments of the disclosure are not limited except as by the appended claims.

We claim:

1. An aircraft recovery system, comprising:
a base assembly; and
an elongated aircraft capture member including a flexible rod having a first end region pivotably coupled to the base assembly and a second, free end region opposite the first end, wherein second end region of the flexible rod is to intercept an unmanned aircraft in flight, wherein the aircraft capture member is to flex during capture in response to landing forces during the capture of the aircraft, wherein, when not flexed, the first end region and the second end region are aligned with each other along a longitudinal axis of the flexible rod.

2. The aircraft recovery system of claim 1, wherein the aircraft capture member is pivotably coupled to the base assembly via an attachment member, and wherein the aircraft capture member is positioned to pivotably move between an angled and a vertical orientation relative to the base assembly.

3. The aircraft recovery system of claim 1, wherein at least part of the second end region is coated with a soft, flexible sheath material to engage at least a portion of the aircraft during recovery, and wherein the sheath material is selected to provide a desired level of friction between the aircraft and the aircraft capture member.

4. The aircraft recovery system of claim 1, wherein:
a first portion flexible rod has a first stiffness; and
a second portion of the flexible rod distal of the first portion has a second stiffness less than the first stiffness.

5. The aircraft recovery system of claim 1, further comprising an energy capture and dissipation assembly operably coupled to the aircraft capture member and positioned to receive at least a portion of the landing forces.

6. The aircraft recovery system of claim 5, wherein the energy capture and dissipation assembly includes at least one of the following: a hydraulic damper, a pneumatic damper, plastically deforming material, a passive take-up reel, and a brake.

7. The aircraft recovery system of claim 1, wherein the first end region and the second end region of the flexible rod are integral with each other.

8. The aircraft recovery system of claim 1, further comprising the unmanned aircraft.

9. An aircraft recovery system comprising:
a base portion; and
means for capturing an aircraft attached to and extending away from the base portion, wherein the means for capturing an aircraft includes a flexible rod including:
a first end attached to the base portion and a second, free end opposite the first end; and
a first portion and a second portion at a distal end of the first portion, wherein the second portion is to intercept an unmanned aircraft in flight, wherein at least one of the first and second portions is to flex during capture in response to landing forces from the aircraft, wherein, when not flexed, the first and second portions are aligned with each other and extend along a longitudinal axis.

10. The aircraft recovery system of claim 9, wherein the flexible rod is composed of at least one of a carbon fiber material, a carbon graphite material, fiberglass, a carbon/graphite composite material, a graphite/boron composite material, or bamboo.

11. The aircraft recovery system of claim 9 wherein at least one of the first and second portions of the means for capturing the aircraft includes:
an inner inflatable portion including one or more bladders to be filled to a desired pressure with a gas; and
an outer engagement portion at least partially covering the inner inflatable portion, wherein the outer engagement portion is positioned to engage the aircraft.

12. The aircraft recovery system of claim 9, further comprising means for capturing and dissipating energy from the aircraft operably coupled to the means for capturing the aircraft, wherein the means for capturing and dissipating energy is positioned to receive at least a portion of the aircraft's kinetic energy.

13. The aircraft recovery system of claim 12, wherein the means for capturing and dissipating energy is carried by the base portion.

14. The aircraft recovery system of claim 9, wherein the means for capturing an aircraft is sized and adapted to suspend the unmanned aircraft out of contact with a support surface or the ground after the unmanned aircraft is intercepted and captured in flight by the second portion of the flexible rod.

15. A method for recovering an unmanned aircraft in flight, the method comprising:
flying an unmanned aircraft to intercept an elongated flexible rod having a first end pivotably coupled to a base portion in contact with a support surface, and a second, free end opposite the first end, wherein the elongated flexible rod is to intercept the unmanned aircraft; and
releasably capturing the aircraft with the elongated flexible rod, wherein at least a portion of the elongated flexible rod is to flex during capture in response to landing forces from the aircraft.

16. The method of claim 15, further comprising suspending the aircraft from the elongated flexible rod and out of contact with the support surface or ground after releasably capturing the aircraft.

17. The method of claim 15, wherein the elongated flexible rod is operably coupled to an energy capture and dissipation assembly, and wherein releasably capturing the aircraft with the elongated flexible rod further includes transferring the landing forces from the aircraft to the energy capture and dissipation assembly via the elongated flexible rod.

18. The method of claim 15, wherein the elongated flexible rod has an initial, first angled orientation relative to the base portion, and wherein releasably capturing the aircraft with the elongated flexible rod includes pivotably moving the elongated flexible rod from the first angled orientation through a vertical position and to a second, angled orientation relative to the base portion different than the first angled orientation.

19. The method of claim 15 wherein:
flying the unmanned aircraft to intercept the elongated flexible rod includes flying the unmanned aircraft such that a leading edge of a wing of the aircraft intercepts the elongated flexible rod; and
releasably capturing the aircraft with the elongated flexible rod includes releasably engaging the elongated flexible rod with a capture device at an outboard edge of the wing.

20. A method for recovering an unmanned aircraft during flight thereof, the method comprising:
capturing the unmanned aircraft via an elongated flexible rod, the elongated flexible rod including a first end pivotably coupled to a base portion in contact with a support surface, and a second free end opposite the first end, wherein the second free end is to contact the unmanned aircraft; wherein at least a portion of the elongated flexible rod is to flex during the capture of the unmanned aircraft and wherein, when the elongated flexible rod is not flexed, the first and second ends are aligned with each other and extend along a longitudinal axis.

21. The method of claim 20, further comprising suspending the aircraft from the elongated flexible rod and out of contact with the support surface or ground after releasably capturing the aircraft.

22. The method of claim 20, wherein the elongated flexible rod is operably coupled to an energy capture and dissipation assembly, and wherein capturing the aircraft with the elongated flexible rod further includes transferring the landing forces from the aircraft to the energy capture and dissipation assembly via the elongated flexible rod.

23. The method of claim 20, wherein the elongated flexible rod has an initial, first angled orientation relative to the base portion, and wherein capturing the aircraft with the elongated flexible rod includes pivotably moving the elongated flexible rod from the first angled orientation through a vertical position and to a second, angled orientation relative to the base portion different than the first angled orientation.

* * * * *